United States Patent Office 3,259,971
Patented July 12, 1966

3,259,971
HIGH TEMPERATURE BRAZE ALLOY AND METHOD OF USING THE SAME FOR MOLYBDENUM, OTHER REFRACTORY METALS AND ALLOYS THEREOF
Leonard J. Gagola, Baltimore, and Charles R. Wilks, Towson, Md., assignors to Martin Marietta Corporation, New York, N.Y., a corporation of Maryland
No Drawing. Filed Dec. 10, 1962, Ser. No. 243,599
5 Claims. (Cl. 29—498)

This invention relates to high temperature brazing of molybdenum and other refractory metals and alloys therof and more particularly to a braze alloy in which the brazement has an appreciably higher remelt temperature than the original brazing temperature.

In the manufacture of high temperature structures or radiant heat shields for application on aero-space vehicles as well as other art structures, it has been found advantageous to employ molybdenum or other refractory metal sheets or sheets formed of alloys thereof in the construction of honeycomb panel members forming portions of the built-up structure or the heat shield. However, when molybdenum and molybdenum alloy sheets are involved in a thermal process in which they are heated above their respective recrystallization temperatures, the sheets lose the strengthening achieved previously by cold working. In addition, one of the more serious concerns is the embrittlement which also follows at ambient temperatures. Certain other refractory metals and their alloys exhibit similar behavior, although not all refractory metals and their alloys are so affected.

Wherever the term "alloys" is utilized in the specification and claims of this application, it shall be understood to mean alloys of the particular metal to which it refers in which that particular metal is the major constituent.

It is, therefore, imperative in order to maintain the high strength and ductility of these and other similarly behaving refractory metal materials particularly for structural applications, that any structural joininging processes such as brazing must be conducted below the recrystallization temperature of the refractory metal or alloy. Even where strength and ductility are not adversely affected, brazing at lower temperatures is desirable from the standpoint of ease of fabrication. Knowing the recrystallization temperature of the refractory metal or alloy, it is quite easy to pick out conventional brazing alloys to effect brazing of the individual elements into an assembly. However, conventional brazing alloys melt and remelt at approximately the same temperature and therefore the assemblies are limited practically to use at operational temperatures several hundred degrees Fahrenheit below the remelt temperature of the brazing alloy.

It is, therefore, apparent that it would be desirable to have a braze alloy melt at a relatively low temperature and through special processing techniques exhibit a considerably higher remelt temperature. At the present time, three techniques are employed to develop high remelt temperature braze alloys. All involve depression of the liquidus temperatures of the main brazing constituents by the addition of other constituents to form lower melting compositions, as for example eutectic mixtures. They differ mainly in the method employed to eliminate the low melting composition in the final brazement. These three methods are: (1) vaporization of a liquidus temperature depressant, (2) exothermic reaction brazing, and (3) diffusion alloying of a liquidus temperature depressant.

With regard to the first technique, in a braze alloy comprising two or more constituents, one of which has a high vapor pressure, the initial braze is made at ambient pressures to retain the volatile constituent and when melting has occurred, the brazement is subjected to low pressures (vacuum) where the high vapor pressure constituent is driven off at or near the original braze temperature. The alloy that results from brazing is characterized by the partial or complete depletion of the high vapor pressure constituent which is vaporized so that the subsequent brazed assembly has a higher remelt temperature.

In exothermic reaction brazing, a reaction material is added to the braze alloy and is capable of giving off relatively large quantities of heat at the locus of the brazed joint, keeping the over-all structure temperature relatively low. In addition, the composition of the brazing alloy is altered as a result of the reaction process. This results again in a brazed assembly having a higher remelt temperature than the original temperature to which the over-all structure was subjected.

The third technique comprises diffusion alloying of a liquidus temperature depressant and by thermal treatment. After brazing, the assembly is subjected to relatively high temperature, slightly under the brazing temperature, for an extended period of time to effect diffusion alloying of the braze alloy constituents, particularly the liquidus temperature depressant, with the base metals to effect a change in the composition of the original brazement alloy. To insure completeness of the reaction between the refractory alloy and the braze alloy, an agent in the form of refractory powder additive may be added to the basic filler alloy.

The present invention is directed to the third technique; diffusion alloying, since it may be advantageously employed in brazing honeycomb sandwich structures. Closed honeycomb sandwich structures may be effectively brazed utilizing this technique, whereas open structures are required for the utilization of the vaporization technique or exothermic process to allow for the escape of the volatile constituents and reaction gases respectively.

It is, therefore, a primary object of this invention to provide a braze alloy and method for using the same in brazing molybdenum or other refractory metals and alloys thereof in which the remelt temperature of the braze assembly is appreciably higher than the original brazing temperature as a result of a diffusion alloying cycle.

It is further an object of this invention to provide an improved braze alloy for use in a diffusion alloying brazing technique which is particularly applicable in the manufacture of molybdenum alloy honeycomb structures.

It is a further object of this invention to provide an improved braze alloy for use in brazing molybdenum or other refractory metals and alloys thereof in which the remelt temperature of the braze assembly is appreciably higher than the original brazing temperature to effect brazing of the assembly at a temperature below the recrystallization temperature of the molybdenum or refractory alloy material, but allowing subsequent subjection of the assembly to temperatures in the recrystallization range without remelting the braze joint.

Specifically, the present invention provides a braze alloy and a method of using the same for use in brazing molybdenum or other refractory metals or alloys thereof in which the remelt temperature of the brazed assembly is appreciably higher than the original brazing temperature as a result of diffusion alloying thereof, said braze alloy comprising by weight 91.5% titanium and 8.5% silicon. In a preferred example, brazing is accomplished at 2450° F. with the holding time at brazing temperature being fifteen minutes. The subsequent diffusion treatment consists in holding the assembly at 2200° F. for three hours and results in an increase in the melting temperature to above 3000° F. To insure completeness of reaction between the braze alloy and the base metal, molybdenum powder is added to the basic filler alloy at an optimum ratio of braze alloy to molybdenum powder of 4:1.

In making use of the braze alloy of the present invention, an assembly of elements is effected by brazing molybdenum sheets formed from "TZM Molybdenum"

manufactured by the Universal Cyclops Steel Corporation, containing the following elements by percentage: titanium .40 to .55, zirconium .06 to 1.2, iron .01 maximum, nickel .002 maximum, silicon .008 maximum, carbon .01 to .04, oxygen .003, nitrogen .002, hydrogen .001, the balance being molybdenum. Of course, the braze alloy of the present invention and its method of use has application to many molybdenum and other refractory alloys, and the above material forms only one example of a large variety of alloys with which the braze alloy may be utilized. With the elements to be brazed formed from the above-identified alloy, the braze alloy of the present invention is employed under a particular diffusion alloying technique to achieve a higher remelt temperature. The braze alloy consists by weight of 91.5 plus or minus 1.0% titanium and 8.5 plus or minus 1.0% silicon. With this braze alloy and the base alloy, a brazing temperature of 2450° to 2600° F. is required for adequate wetting and filleting of the braze alloy. At the same time, close compositional control is required to insure satisfactory wetting and filleting, and such control is needed to realize the minimum brazing temperatures of the titanium-silicon system.

To insure the completeness of the reaction between the braze alloy (Ti-8.5% Si) and the base metal, an agent such as molybdenum powder or columbium powder must be added to the basic filler alloy. Of course, the molybdenum powder is added subsequently to the formation of the titanium-8.5% silicon alloy powder since the addition of the molybdenum or columbium powder at the same time the titanium-silicon alloy is originally formed would produce a completely different alloy. A ratio of braze alloy to molybdenum or columbium powder of 4:1 was found to be optimum.

Another method requirement of the present invention is that of diffusion alloying since the mere utilization of the brazing alloy with the prescribed filler at brazing temperature from 2450° F. to 2600° F. for a relatively short period of fifteen minutes or so to effect brazing, results in very little alloying of the filler material with the base material and the molybdenum or columbium powder. It is necessary to utilize diffusion alloying, that is, the subjection of the brazed assembly to a temperature slightly less than the temperature at which brazing occurs for an extended period of time. The time-temperature cycle of course varies depending upon the particular base alloy of the material being brazed. After a three-hour diffusion heat treatment at 2200° F. (which was found to be a preferred diffusion treatment cycle), a definite alloy zone is formed between the base metal and the braze alloy. There is also diffusion alloying of the (Ti-8.5% Si) alloy and the molybdenum or columbium powder.

With the subsequent diffusion treatment as outlined above, a remelt temperature in excess of 3000° F. has been obtained consistently for the TZM, Ti-8.5% silicon combination which forms the present example. While various diffusion heat treatment cycles have been evaluated, the 2200° F. treatment for three hours appears to be optimum. Longer times and/or higher diffusion heat treating temperatures do not seem to increase the remelt or separation temperature of the braze system. Maximum temperature achieved for the TZM Ti-8.5% Si combination in which separation did not occur is 3150° F. for joint loads up to 4 p.s.i. and 2950° F. for joint load of 6 p.s.i.

It is important to note the characteristics of the braze as a result of utilization of the Ti-8.5% Si braze alloy, at a brazing temperature in the order of 2550° F., with subsequent time-temperature diffusion alloy treatment of three hours at 2200° F. Good flow and filleting results with the braze joint exhibiting excellent ductility. At the same time, subsequent diffusion treatment as mentioned previously raises the remelt temperature to above 2950° F. and as much as 3150° F. for relatively low loads approximating the 4 p.s.i. range. While the braze alloy and the method of the present invention has been specifically developed for molybdenum and molybdenum alloys, it is theoretically usable for columbium, tantalum, and tungsten and their alloys as well. Of course, the diffusion cycle will be varied for the particular base alloy, although the braze alloy will remain the same. For example, limited tests have been conducted with a columbium alloy utilizing the Ti-8.5% Si braze alloy. Remelt temperatures of 2800 to 2900° F. have been attained with various diffusion treatment cycles, although no attempt has been made to optimize completely the diffusion treatment. It will, therefore, be understood that various omissions and substitutions in the base alloys may be used by those skilled in the art without departing from the spirit of the invention. It is the intention, therefore, to be limited only as indicated by the scope of the following claims.

What is claimed is:

1. A brazing compound for use in brazing parts selected from the group consisting of molybdenum, columbium, tantalum, tungsten, and refractory alloys of these metals in which the remelt temperature of the brazement is appreciably higher than the original brazing temperature of the brazing alloy as a result of subsequent diffusion alloying, said brazing compound comprising a mixture of a braze alloy consisting of 91.5 plus or minus 1.0% titanium and 8.5 plus or minus 1.0% silicon by weight and a powdered metal selected from the group consisting of molybdenum and columbium, the ratio of braze alloy to powdered metal being respectively by weight in the range of 4 to 5:1.

2. A brazing compound for use in brazing parts selected from the group consisting of molybdenum, columbium, tantalum, tungsten, and refractory alloys of these metals in which the remelt temperature of the brazement is appreciably higher than the original melting temperature of the braze alloy as a result of subsequent diffusion alloying at 2200° F. for a time period of from three to six hours, said brazing compound comprising a braze alloy consisting of 91.5 plus or minus 1.0% titanium and 8.5 plus or minus 1.0% silicon by weight and a metal powder selected from the group consisting of columbium and molybdenum, the ratio of braze alloy to powder metal being in the range of 4 to 5:1 respectively.

3. A method of brazing parts selected from the group consisting of molybdenum, columbium, tantalum, tungsten, and refractory alloys of these metals in which the remelt temperature of the brazement is appreciably higher than the original brazing temperature of the brazing alloy which comprises: forming a braze alloy consisting of 91.5 plus or minus 1.0% titanium and 8.5 plus or minus 1.0% silicon by weight, forming a brazing compound of said brazing alloy and a powdered metal selected from the group consisting of molybdenum and columbium, with the ratio of braze alloy and powdered metal being respectively by weight in the range of 4 or 5:1, brazing the assembly including said brazing compound at a temperature of 2450° F. to 2600° F. for a time period up to fifteen minutes, and diffusion alloying said brazed assembly at a temperature of 2200° F. for three to six hours.

4. A method of brazing parts selected from the group consisting of molybdenum, columbium, tantalum, tungsten, and refractory alloys of these metals in which the remelt temperature of the brazement is appreciably higher than the original melting temperature of the braze alloy comprising the step of: forming a braze alloy comprising by weight 91.5 plus or minus 1.0% titanium and 8.5 plus or minus 1.0% silicon, forming a braze compound comprising a mixture of said braze alloy and a powdered metal selected from the group consisting of molybdenum and columbium, the ratio of braze alloy to powdered metal being respectively by weight in the range of 4 to 5:1, brazing the assembly including said brazing compound at a temperature of 2450° F. for a time period of 15 minutes and diffusion alloying said brazed assembly at a temperature of 2200° F. for a time period of 3 hours.

5. A method of brazing molybdenum or alloys thereof in which the remelt temperature of the brazement is appreciably higher than the original melting temperature of the braze alloy comprising the steps of: forming a braze alloy comprising by weight 91.5 plus or minus 1.0% titanium and 8.5 plus or minus 1.0% silicon, forming a braze compound comprising a mixture of said braze alloy and a powdered metal selected from the group consisting of molybdenum and columbium, the ratio of braze alloy to powdered metal being respectively by weight in the range of 4 to 5:1, brazing the assembly including said brazing compound at a temperature of 2450° F. for a time period of fifteen minutes and diffusion alloying said brazed assembly at a temperature of 2200° F. for a time period of three hours.

References Cited by the Examiner

UNITED STATES PATENTS 3,073,269    1/1963    Hoppin et al. _____ 29—504 X

OTHER REFERENCES

Hansen, Constitution of Binary Alloys, page 1198, published in 1958 by McGraw-Hill Book Co., Inc., New York, N.Y.

JOHN F. CAMPBELL, *Primary Examiner.*